United States Patent [19]
Mannion et al.

[11] Patent Number: 5,138,845
[45] Date of Patent: Aug. 18, 1992

[54] METHOD AND APPARATUS FOR CONTROLLING THE FLOW OF PROCESS FLUIDS

[75] Inventors: Gerald F. Mannion, Naperville, Ill.; James R. Mannion, Oconomowoc, Wis.

[73] Assignee: BRDG-TNDR Corporation, Ft. Lauderdale, Fla.

[21] Appl. No.: 682,242

[22] Filed: Apr. 9, 1991

[51] Int. Cl.⁵ .......................................... F25D 17/02
[52] U.S. Cl. ........................................ 62/99; 62/185; 165/22
[58] Field of Search .................. 62/185, 99, 180, 201; 165/22, 39

[56] References Cited

U.S. PATENT DOCUMENTS

| | | | |
|---|---|---|---|
| 3,729,051 | 4/1973 | Mannion et al. | 165/22 |
| 3,859,812 | 1/1975 | Pavlak | 62/185 X |
| 3,875,995 | 4/1975 | Mannion et al. | 165/22 |
| 4,673,031 | 6/1987 | Wiemer | 165/39 |
| 4,744,408 | 5/1988 | Pearson et al. | 62/185 |

Primary Examiner—William E. Wayner
Attorney, Agent, or Firm—Dominik, Stein, Saccocio, Reese, Colitz & VanDerWall

[57] ABSTRACT

A method and apparatus for controlling the flow of process fluids comprising a primary loop for process fluids; a plurality of secondary loops for the process fluids; a plurality of bridges, each coupling the primary loop with a secondary loop, each bridge having feed and return connections coupled to feed and return lines of the primary loop and feed and return connections coupled to feed and return lines of the secondary loop, and a crossover line coupling the primary and secondary loops; valve means for each bridge for controlling the flow of processing fluid through its associated second loop; microprocessor means for each bridge for adjusting its associated valve means; sensor means for each bridge for determining operating characteristic information of the processing fluid and for feeding such determined information to the microprocessor means; and a host computer coupling each of the microprocessor means in systems configuration.

27 Claims, 6 Drawing Sheets

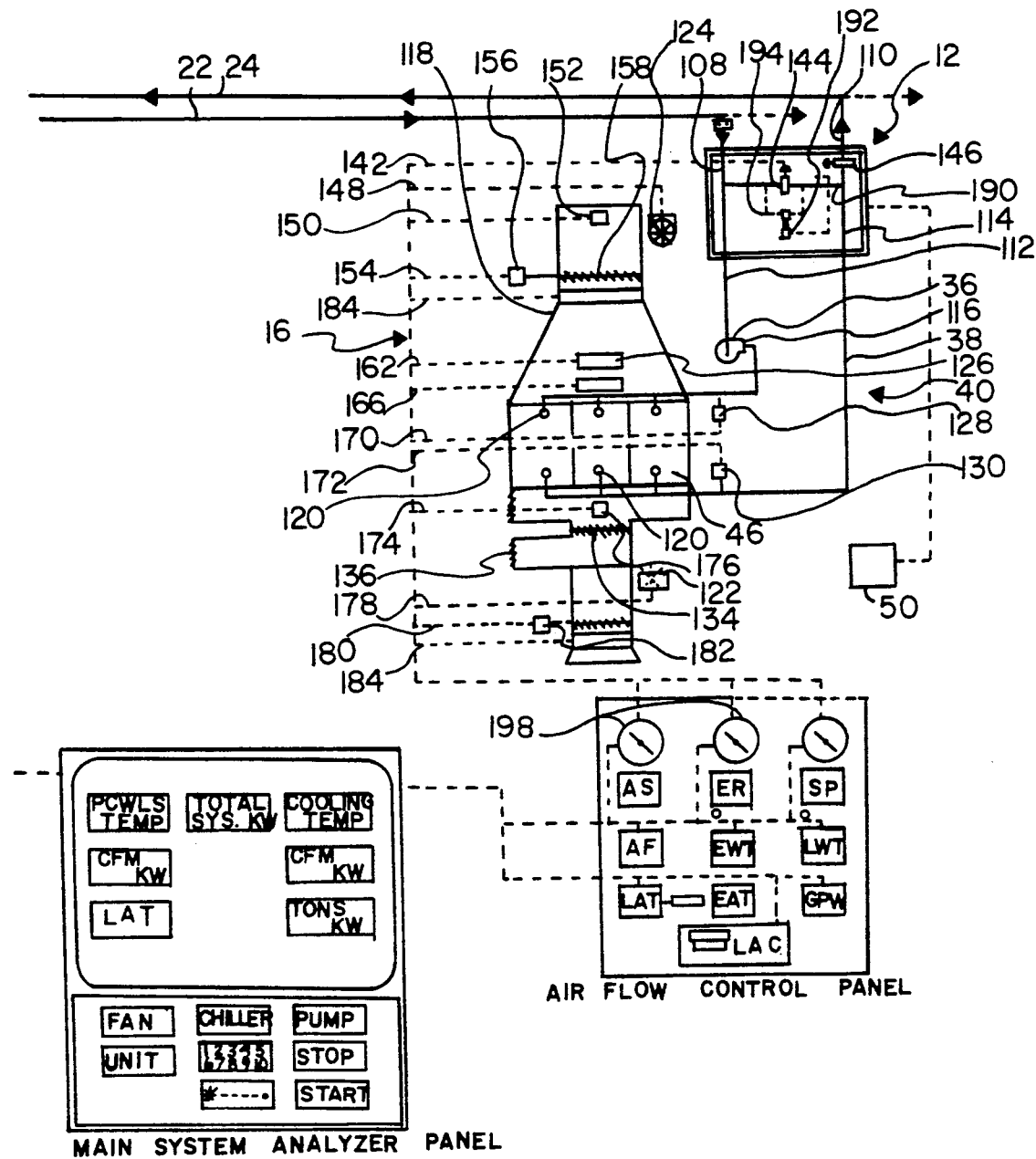
FIG. IA

METHOD AND APPARATUS FOR CONTROLLING THE FLOW OF PROCESS FLUIDS

FIELD OF THE INVENTION

This invention relates to a method and apparatus for controlling the flow of process fluids and, more particularly, to a system for feeding process water in a controlled manner through a primary loop and secondary loops as a function of the temperature of fluid being processed by the process water.

DESCRIPTION OF THE BACKGROUND ART

In the field of flow control systems, one technique for providing chilled process water to a plurality of remotes sites is to use a primary flow loop from chillers to the sites where the water is to be utilized, as for air cooling, and then back to the chillers for recyling in a continuous cycle of operation. At the remote sites where the process water is to be used, secondary flow loops tap from, and return to, the primary loop, the chilled water for use in air cooling at each of the various sites. As a result, there is one primary loop in a continuous flow and a plurality of secondary loops for utilizing the water from the primary loop as needed.

In considering any one secondary loop, there will be a section of crossover line which is common with both the primary loop and the secondary loop. The apparatus coupling the primary loop with a secondary loop is a water bridge. A primary pump is used to continuously feed the water through the primary loop. A secondary pump is used to feed the water through each secondary loop but only at a given rate and only when required. Without appropriate controls, however, the system would be very inefficient, chilling and/or feeding more or less water than is needed for the intended air cooling.

In U.S. Pat. No. 3,729,051, the problem of controlling the quantity of flowing water was addressed and solved. According to that patent, a small supplemental water line is placed across the common extent of the primary and each secondary loop. The supplemental line at each secondary loop was of a significantly smaller diameter for a limited flow, merely sufficient to sense a primary flow balance between the primary loop and the flow of the secondary loop.

For optimum efficiency, the flow through the primary loop should equal the flow through the total of secondary loops. If insufficient water is pumped in either loop, the intended cooling will not be effected. If excess water is pumped, unnecessary energy will be expended in moving the water. By sensing the flow along the supplemental line, verification may be made that water is flowing and that pressure exists in the suplemental line. So long as the sensed water in the supplemental line remains at the optimum predetermined flow, no change is made to the fluid flow. If, however, the sensed water varies from the predetermined flow, a signal is sent back to a first control valve in the primary loop to restrict the flow and thereby minimize the work done by the pump of the primary loop. This effects a greater efficiency.

In a subsequent improvement, as described in the U.S. Pat. No. 3,875,995, temperature as well as flow is taken into account for controlling water flow. In the event that the water in the secondary loop varies from its intended, predetermined temperature, inefficiency results. If the temperature of the water in the secondary loop is not cool enough, the intended air cooling will not be effected. If the temperature of the water in the secondary loop is too cool, excess chilling is being done at an unnecessary cost to the system and its user. As a result, a temperature control sensor is provided. So long as the sensed temperature is at a predetermined value, the chilling simply continues. If, however, the temperature deviates from the predetermined value, the difference is sensed and a signal is sent to a second control valve located in the crossover line of the water bridge to vary the quantity of chilled water provided to the secondary loop. This feature further increases the efficiency of the system.

In a third improvement to fluid control systems, as described in the copyrighted BRDG-TNDR Corporation brochure of 1988, the signals generated for temperature and flow control are fed back from the water bridges of the air cooling subassemblies to the water chiller subassembly to vary the amount of recirculating water being fed through the chiller to thereby modify the temperature and flow of the water in the primary loop. By keeping the water in the primary loop at a preselected temperature and flow for a particular application further efficiencies are effected in the system.

A fourth improvement is disclosed in U.S. patent application Ser. No. 464,346 filed Jan. 12, 1990. In its simplest terms, such fourth improvement is an improvement over prior flow control systems in that the temperature and flow sensors are replaced with electronic sensors of a size and capability more efficient than those previously know and utilized. Their use in the lines of fluid flow, as described above, not only generate more accurate readings but have less effect on the flow. This further increases the accuracy of readings and provides greater control and efficiency in the system. In addition, each temperature sensor is removed from the site of sensing and repositioned with its controller adjacent to its controlled valve. As such, all electronic controls for each secondary loop are integrated into a common controller for greater overall efficiency. This more readily allows all the controllers for all the secondary loops to be in two-way communication with a common host computer for integration of the system generally. As such, the efficiencies effected to the system are greater than the sum of the efficiencies of the individual water bridges.

As referred to above, the prior art discloses systems for controlling the flow of process fluids. Nothing in the prior art, however, controls the flow with the accuracy and efficiency afforded by the present invention.

Accordingly, it is an object of this invention to provide a method and apparatus which overcomes the aforementioned shortcomings and which is a significant contribution to the advancement of the arts.

It is a further object of the invention to provide a method and apparatus for coupling a primary and secondary loop for circulating processing fluids therebetween comprising a first connection for the feed line of the primary loop, a second connection for the return line of the primary loop, a third connection for the feed line of the secondary loop and a fourth connection for the return line of the secondary loop; a crossover line coupling the four connections; first valve means with a first sensor means responsive to the flow across the crossover line to control the first valve means; second valve means with a second sensor means responsive to the temperature of the process fluid in the secondary loop to control the second valve means; a common microprocessor for the first and second sensor means to control the first and second valve means as a function of the sensed flow and temperature; and a computer associated with each secondary loop operable in response to the temperature associated with load fluid adjacent to its associated secondary loop to control the common microprocessor for each secondary loop.

It is a further object of this invention to provide controllers/sensors with two-way communications for the purpose of talking with a host computer and data acquisition equipment to thereby allow for control reset, control limits, systems management, trending, historical data accumulation, etc., based upon the property of the of air being processed.

A further object of the present invention is to monitor the fluid temperatures before and after being processed for the purpose of resetting flow and temperature set points to thereby control the flow of processing fluid.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

Acordingly, the present invention may be incorporated into an improved system for controlling the flow of process fluids comprising a primary loop for process fluids; a plurality of secondary loops for the process fluids; a plurality of bridges, each coupling the primary loop with a secondary loop, each bridge having feed and return connections coupled to feed and return lines of the primary loop and feed and return connections coupled to feed and return lines of the secondary loop, and a crossover line coupling the primary and secondary loops; valve means for each bridge for controlling the flow of processing fluid through its associated secondary loop; microprocessor means for each bridge for adjusting its associated valve means; sensor means for each bridge for determining operating characteristic information of the processing fluid and for feeding such determined information to the microprocessor means; and a host computer coupling each of the microprocessor means in systems configuration.

The forgoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiments may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 and FIG. 1A together constitute a schematic illustration of a fluid control system constructed in accordance with the principles of the present invention, the water chiller subsystem being shown in FIG. 1 and the air cooler subsystem being shown in FIG. 1A.

Similar reference numerals refer to similar parts throughout the various drawings.

DETAILED DESCRIPTION OF THE INVENTION

Overview

Figure 1:
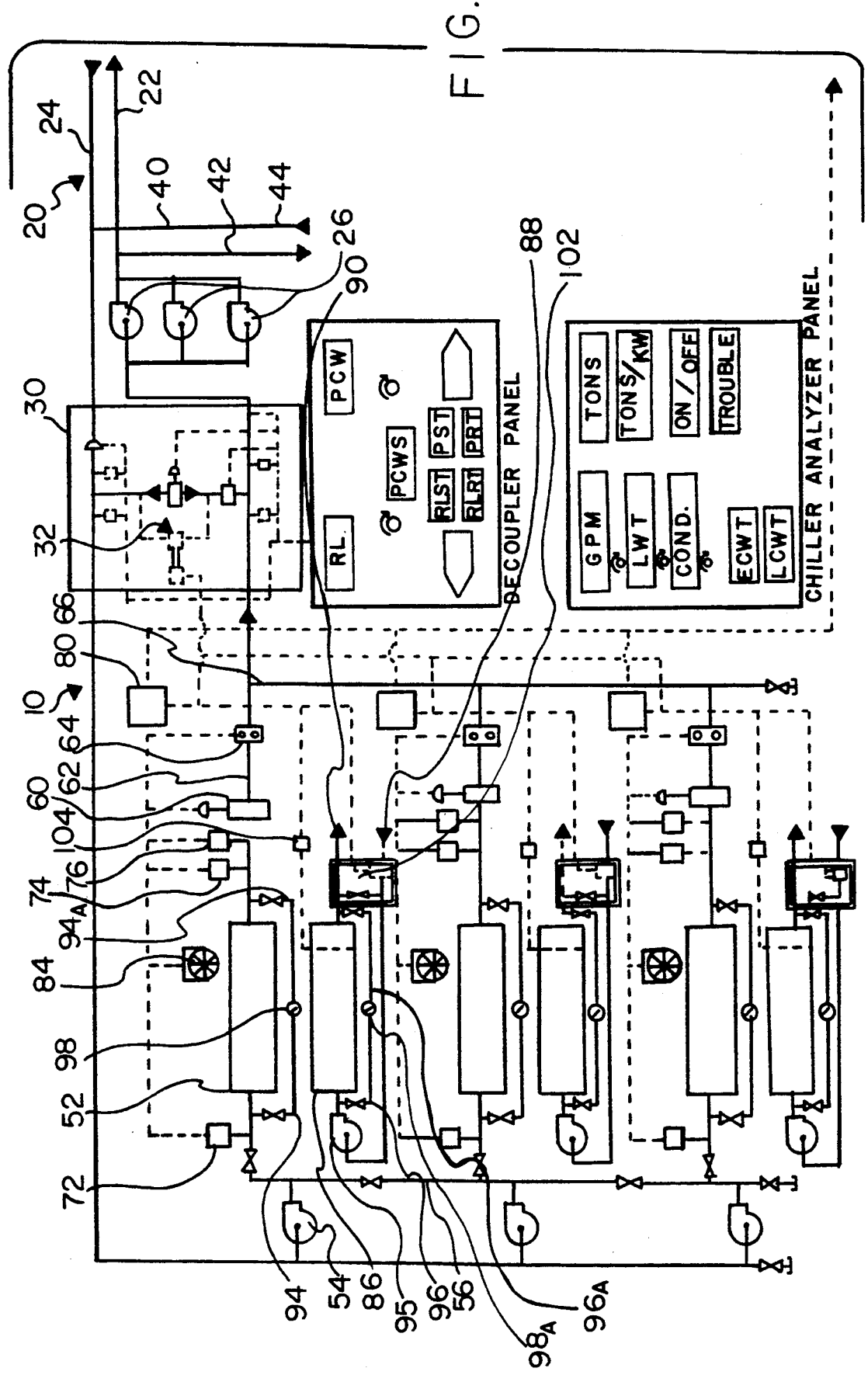

FIGS. 1 and 1A, when taken together, represent a schematic overview of a system 10 employing the water bridge 12 and control elements of the present invention. The FIG. 1 components are generally directed to the subsystem 14 for chilling the process fluid such as water to be utilized. FIG. 1A illustrates the components of the subsystem 16 wherein the chilled water is utilized as for air cooling purposes. The two subsystems are coupled by a common primary loop 20 including feed and return lines 22, 24. Also coupling the two subsystems are auxiliary feed water booster pumps 26 along with a fluid flow decoupler assembly 30 in advance of the booster pumps. Such fluid flow decoupler assembly 30 includes a water bridge 32 being of the type described in the aforementioned '051 patent.

Figure 2:
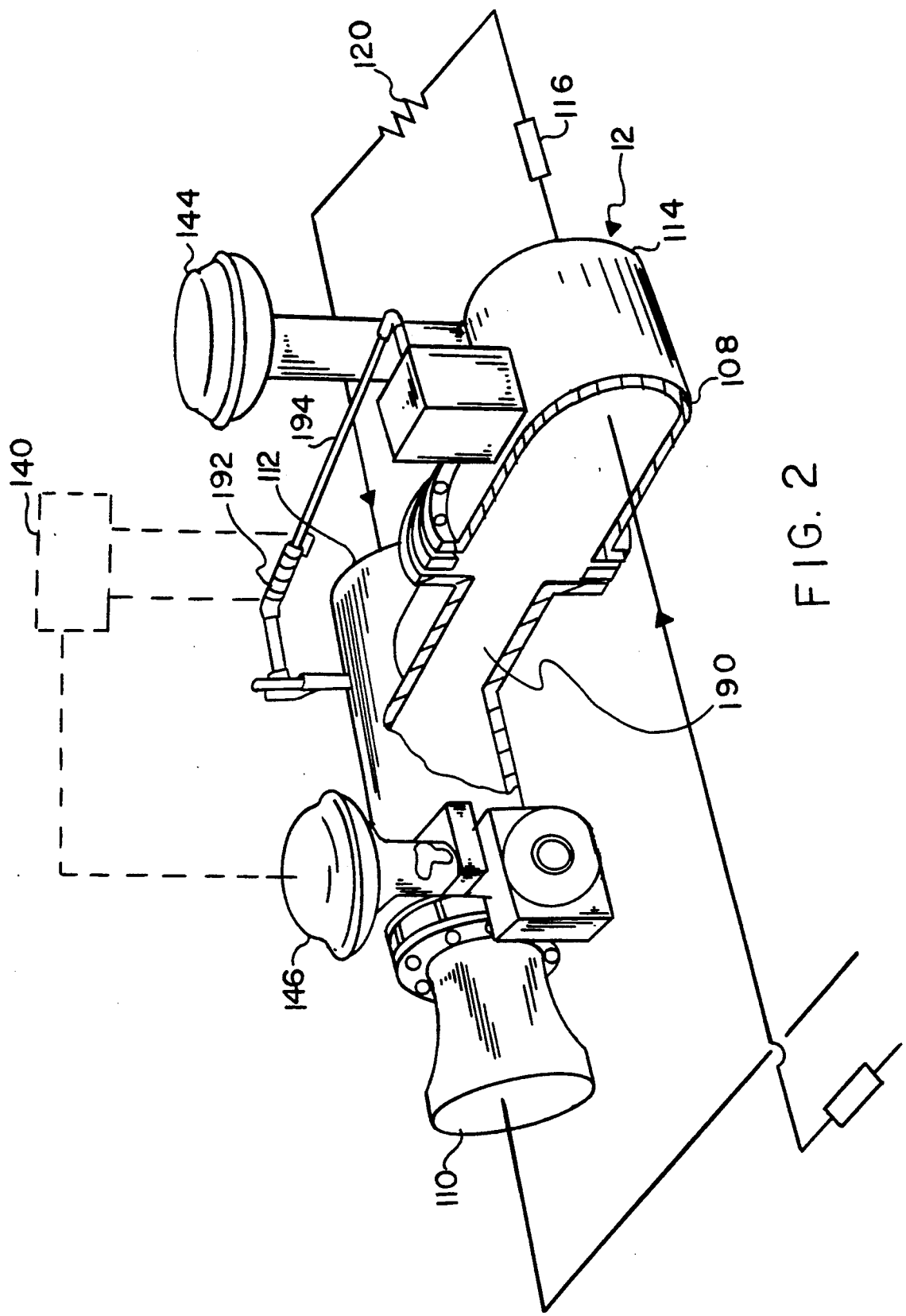
FIG. 2 is a perspective illustration of the water bridge which is shown schematically in the upper right-hand corner of FIG. 1A.

FIG. 1A shows the components for utilizing the chilled process water and includes a water bridge 12 coupling the lines of the primary loop 20 with the feed and return lines 36, 38 of one illustrative secondary loop 40. The water bridge 12 is more specifically described hereinafter and can be seen in the mechanical perspective illustration and the electrical schematic of FIG. 2. FIG. 1 also illustrates supplemental lines 42, 44 of the primary loop 20 for conveying the process water to sites other than the shown site 46 whereat it may be tapped through any number of additional water bridges for secondary loops for utilization at such additional sites other than that as shown in FIG 1A.

Also shown in FIG. 1, as well as FIG. 1A, are a plurality of panels for monitoring and controlling the operation of the system 10. These panels include the decoupler panel, the chiller analyzer panel, the air flow control panel, the system analyzer panel, and the host computer 50.

Water Chiller Subsystem

The FIG. 1 showing illustrates in detail a typical chiller subsystem 14. Any number of individual chillers 52 might be used in the chiller subsystem. FIG. 1 illustrates three chillers, each with its own accompanying support elements. It should be understood, however, that one or any number might be used in parallel similar to the way the three such chillers are illustrated. For the sake of convenience only one chiller and its associated support elements will be described herein.

The chiller 52 has an input end to receive recirculating process water from the return line 24 of the primary loop 20. A chiller pump 54 taps a preselected quantity of process water from the return line and feed it to an intermediate input line 56 coupling the inputs of the various chillers of the subsystem. A line extends through the chiller to its output end and constitutes a separate chiller loop at the starting point of the primary loop. A flow control valve 60 is positioned in the output line 62 of the chiller. The control valve flow is followed by a flow transducer 64, a flow meter and transmitter, prior to coupling in the output of the other chillers through an output mixing line 66. Thereafter the chiller output is fed through the water bridge 32 of the decoupler assembly 30 followed by the transport or booster pumps 26. This water bridge 32 is of the type disclosed in the aforementioned '051 patent. Temperature sensors 72, 74, 76 are located to determine the chiller entering water temperature as well as the chiller leaving water temperature and feed such information to the controller 80. The output of a flow transducer 64 is also fed to the controller 80. The controller 80 acts to vary the flow control valve 60 in order to maintain the flow rate at a proper level for the intended function. The output of the controller is also fed to the chiller analyzer panel as well as the system analyzer panel for monitoring and controlling the performance of the system overall.

Operating in association with each chiller 52 is an associated condenser 86. The condenser 86 receives and disseminates water to and from a tower, not shown, through feed and return lines 88, 90, the force being provided by a condenser pump 95. A compressor 84 thermally couples the chiller and condenser. Pressure transfer lines 96, 96a from the input and output of the condenser 86 feed a flow indicating switch 98a. A condenser valve 102, in the nature of that in the water bridge, is coupled between the tower and the condenser for monitoring and controlling the temperature or flow of the water through the condenser. A pressure transmitter controller 104 is located between the condenser and flow controller to sense the pressure in the condenser and to feed its output to the flow controller for control of the condenser valve.

The foregoing sets forth the elements by which the process water of the system is chilled, monitored, and controlled for providing water to the transport primary loop 20 for use by the secondary loop 40. The chiller subassembly 14 has several signal outputs to the various control panels as will be later described.

Air Cooling Subassembly

A typical air cooling subassembly is based upon a secondary loop as shown in FIG. 1A. It includes a water bridge 12 having connections 108 and 110, FIG. 2, tapped into the feed and return lines 22, 24 of the primary transport loop 20 and connections 112, 114 tapped into the feed and output lines 36, 38 of the secondary loop 40. The secondary loop 40 includes a secondary cooling coil pump 116 and, intermediate their ends, cooling coils 120 located in an air duct 118. Within the duct, a return exhaust fan 122 and a supply air fan 124 move air to be conditioned by fluid, preferably chilled water, in the coils 120 of the secondary loop 40. A sensor 126 is located in the flow of conditioned air for effectively determining the temperature of the air downstream of the coils. In the alternative, the secondary loop temperature is monitored by sensors 128 and/or 130 in the secondary loop feed and/or return lines 36, 38. A recirculating damper 134 and exhaust damper 136 are utilized in the ducting for air flow control.

All of the operating parameters, including kilowatt usage of the various motors, as well as the various temperatures and pressures are monitored through a control panel for the fan unit in the secondary loop. The controller assembly for each secondary loop unit also has adjustment mechanisms for controlling the operations of the operating characteristics of the elements associated with the secondary loop. The output of each secondary loop controller assembly, like the output of the primary loop flow controller 80, are fed into the system analyzer for monitoring and controlling the entire system. The signals associated with the airflow subassembly include (a) a feedback line 142 to the temperature valve 144 and flow valve 146 of the water bridge 12, (b) a line 142 for power to, and a reading from the supply air fan 124, (c) a reading of a static flow sensor 152, (d) a line 154 for the motor 156 for the damper 158 on the air outlet side of the duct, (e) a line 162 for reading from the leaving air flow temperature, (f) a line 166 for reading of the air temperature, (g) a line 170 to a sensor 128 for a reading of the entering water temperature of the coils, (h) a line 172 to a sensor 130 for a reading of the temperature of the leaving water of the coils, (i) a line 172 for reading of the air input temperature by sensor 176, (j) a line 178 for power to, and a reading from, the return air flow fan, 122 (k) a line 180 with power to, reading of and control of the damper motor 182, and (l) line 184 for readings of the air flow input and output.

Various motors for the air supply and ducting are coupled through a common control package, not shown, for correlating the power thereof in the conventional manner.

Water Bridge

The bridge for fluid, preferably water, is a device positionable to couple the feed and return lines of the primary transport loop 20 with the input return lines of the secondary loop 40. A common crossover line 190 couples these two loops. Primary pump 26 feeds the process water through the primary transport loop. A secondary pump 116 feeds the process fluid through the secondary loop as needed. In those conditions when it is not desired for the secondary loop to function for its air cooling purposes, the secondary pump is inactivated. This closes the crossover line 190. Because cooling is shut down, valve 146 senses the demand for cooling and closes. This response stops unnecessary bypass flow through the secondary loop when not required. The constantly operating pump of the primary loop feeds small quantities of process fluid through a supplemental line 194, passing a sensor 192, from supply to return with no bypass through the secondary loop or crossover conduit 190. When, however, it is desires to utilize the secondary loop for its cooling function, the secondary pump 116 is activated so that a flow of process fluid is created to the secondary loop. The first or flow responsive valve 146 (V-1) is located in the water bridge adjacent the return line of the primary loop. This flow valve is available to control the total flow of fluid through the primary loop to meet the demand needs of the secondary loop.

The flow valve 146 is opened or closed to any extent as a function of the pressure drop across the crossover line 190. This is effected through a sensor 192 coupled with respect to the crossover line preferably in association with an additional smaller supplemental line 194 coupling the ends of the crossover line 196 in parallel therewith to effect a significantly lesser, but proportional, flow and flow through the supplemental line 194 as compared with the larger flow through the crossover line. The detected flow correlates directly to the fluid flow across the cross-over line which, through the controls located at the supplemental line, open or close the flow valve proportionately for effecting the proper fluid flow through the secondary loop.

A second or temperature responsive valve 144 (V-2) is located intermediate the ends of the supplemental crosssover lines. Like the first valve, the second valve is variable to proportionately restrict the flow of fluid, but through the crossover line. This valve is controlled through the controller with its temperature sensor located at any one of a plurality of predetermined points such as in the airflow at the output of the cooling tubes 120, at the input to the secondary loop shown as sensor 128, at the output of the secondary loop shown as sensor 130, etc. So long as the temperature is within a predetermined range, the valve will not vary. Once, however, its sensor detects a change from the desired temperature, this information is fed to the controller for increasing or opening or closing the temperature responsive valve appropriately.

In operation and use, when a sescondary loop 40 requires little or no cooling power from the processing fluid, such flow will be noticed through the flow sensor 40 and the flow valve 146 will close an apporpriate amount to restrict the flow of the process fluid through the primary loop 20 and thereby minimize power usage on the pumps and on the chillers. When, however, usage by the secondary loops 40 is increased, additional processing fluid and chilling will be required. This information will be fed back and the flow valve will open an appropriate amount as determined through the controller.

In a correlated manner, when the temperature of the process water of the secondary loop becomes excessively cool, or the process water in the secondary loop 40 becomes acceptably cool, the temperature valve 144 will open appropriately to restrict its use and also signal the decoupler assembly 30 to recirculate and use less chilled process water. Conversely, if the air or other sensor temperature becomes too warm, the temperature valve will close and the chilled process water will flow in greater quantities to effect the desired increased chilling.

Water Bridge Controls

In the prior art water bridges, the sensor for temperature and flow were appropriately located in the area where sensing was to occur. The controller for the temperature sensor was located at the temperature sensor while the controller for the flow sensor was located adjacent to its associated valve. The controller, one for each water bridge, was set and controlled independent of associated controllers.

In accordance with the present invention, the controller for each water bridge 12 is a common controller unit 140 located at the crossover line 190. The controller of the water bridge is coupled to its remote sensors but with the flow sensor built integral with its controller. The individual controllers for the individual water bridges are then coupled to a common host computer 50 which, unlike the prior art devices, allows for feed back conttrol information to the individual controllers in communication fashion. The host computer then, in effect, controls the flow and temperature valves of all the water bridges of all the secondary loops in an integrated systems manner. Further, one sensed condition, the temperature differential between air immediately before and after cooling, is utilized for controlling the flow of processing fluid through the water bridge by the appropriate adjustment of valves.

Creation of a water bridge system that is not sensitive to the selection of measurement and control devices to the extent that they are appropriately applied, requires an order of magnitude increase in the sophistication of the control of the process elements. To accomplish this, the performance and response of the system must be modeled in the control devices to facilitate a mapped response profile of the actual process. A map is an electronic profile of the system performance characteristics. Mapping involves the direction and intensity of the loads to change under certain outside air and interior environmental demands. Further, a method of reducing the effect of system fluctuations on the resultant process control equations requires a method to statistically filter the control signals and use only a true indication of the process conditions to control the process. This solution addresses the requirements for each of the process functions.

Figure 3:
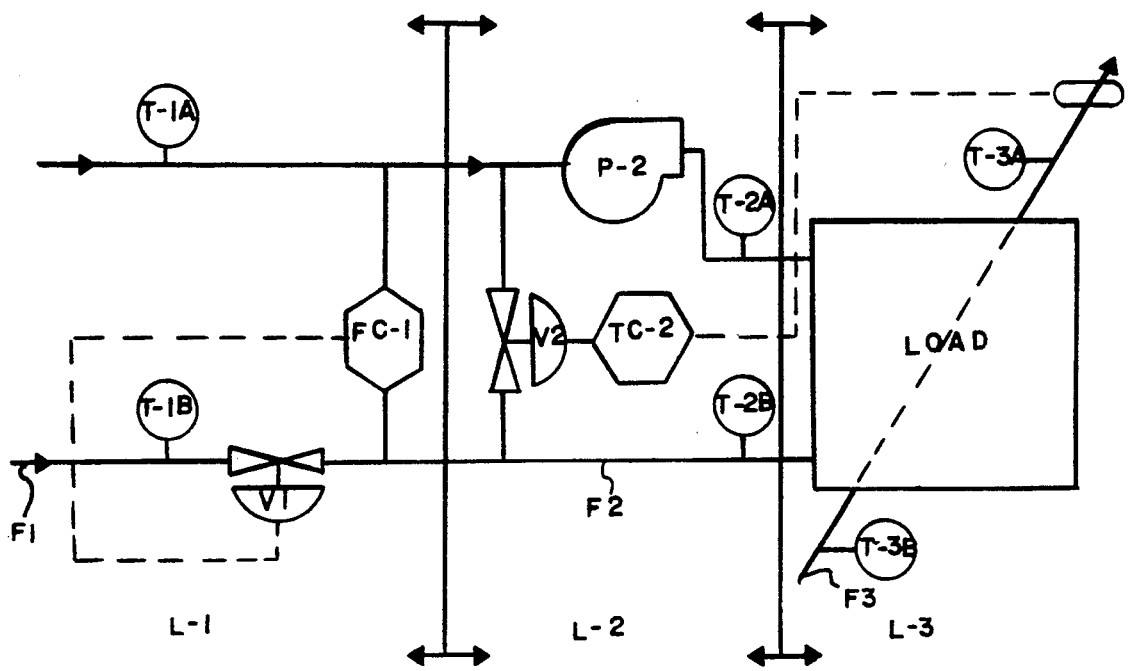
FIG. 3 is a schematic representation of a load of one of the water bridges with associated coponents and with sensors at the input and output ends of the load.

FIG. 3 depicts a typical load such as a cooling coil.

F-3 indicates the air flow through the cooling coil.

T-3$b$ is the entering dry bulb temperature condition.

T-3$a$ is the leaving dry bulb condition.

F-2 is the fluid flow through the secondary circulation system serving the load.

P-2 is the prime mover, pump 116, of the fluid through the secondary circulation system.

T-2$a$ is the fluid temperature being delivered to the load.

T-2$b$ is the fluid temperature for the secondary circulation system returning from the load.

F-1 is the fluid flow through the primary circulation system serving the secondary system.

T-1$a$ is the fluid temperature being delivered to the secondary system.

T-1$b$ is the fluid temperature being returned from the secondary system.

TC-2 is a control device used to control the dischrge fluid temperature leaving the load.

V-2 is a fluid flow controlling device receiving a control signal from TC-2

FC-1 is a control device used to control the fluid interface between the primary and secondary fluid flow systems.

V-1 is a fluid flow controlling device receiving a control signal from FC-1.

L-3 is the Load including the sensing points T-3A, T-3B, T-3C, T-3D, F-3 and BTU Comp-3, along with the load heat transfer equipment.

L-2 is the secondary heat transfer distribution module including P-2, T-2A, T-2B, F-2, TC-2, V-2, BTU COMP-2 and their associated piping and wiring.

L-1 is the primary heat transfer distribution module including T-1A, T-1B, F-1, FC-1, V-1, BTU COMP-1, and their associated piping and wiring.

Figure 4:
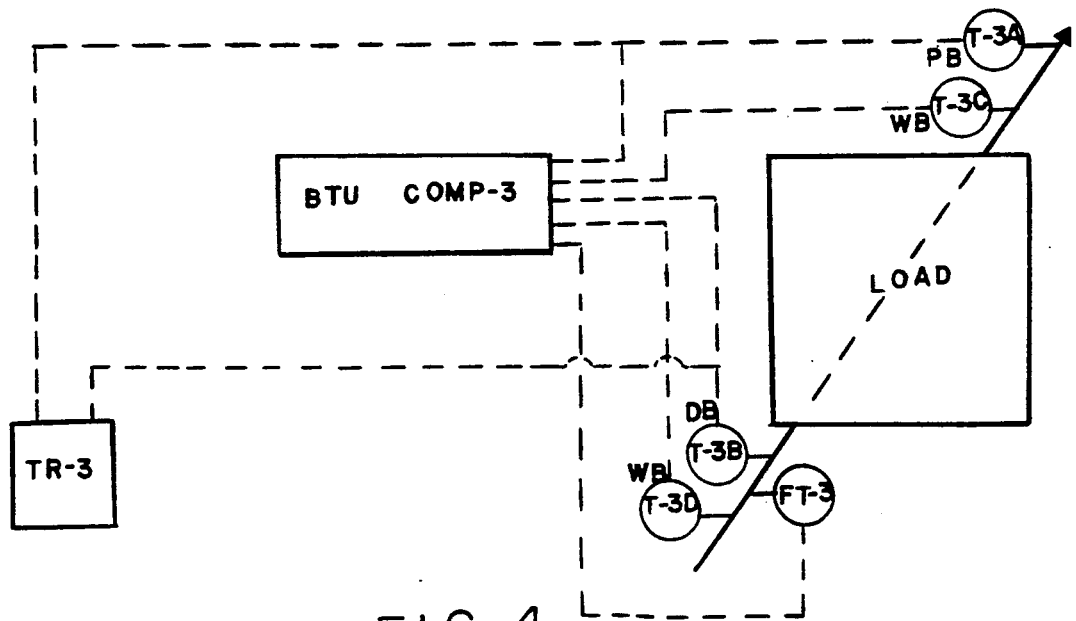
FIG. 4 is similar to FIG. 3 but illustrating the load sensors in greater detail.

FIG. 4 depicts a cooling coil load device similar to that shown in FIG. 3. Additional devices have been added.

T-3c is the discharge wet bulb temperature of the air leaving the load coil.

T-3d is the entering wet bulb temperature of the air to the load coil.

FT-3 is a flow sensing element measuring the air flow through the load coil.

BTU COMP-3 is a computer that receives imputs from FT-3, T-3a, T-3b, T-3c and T-3d. The computer calculates the actual BTU load of the coil.

TR-3 is a signal comparator that receives inputs from T-3a and T-3b for final control analysis.

Figure 5:
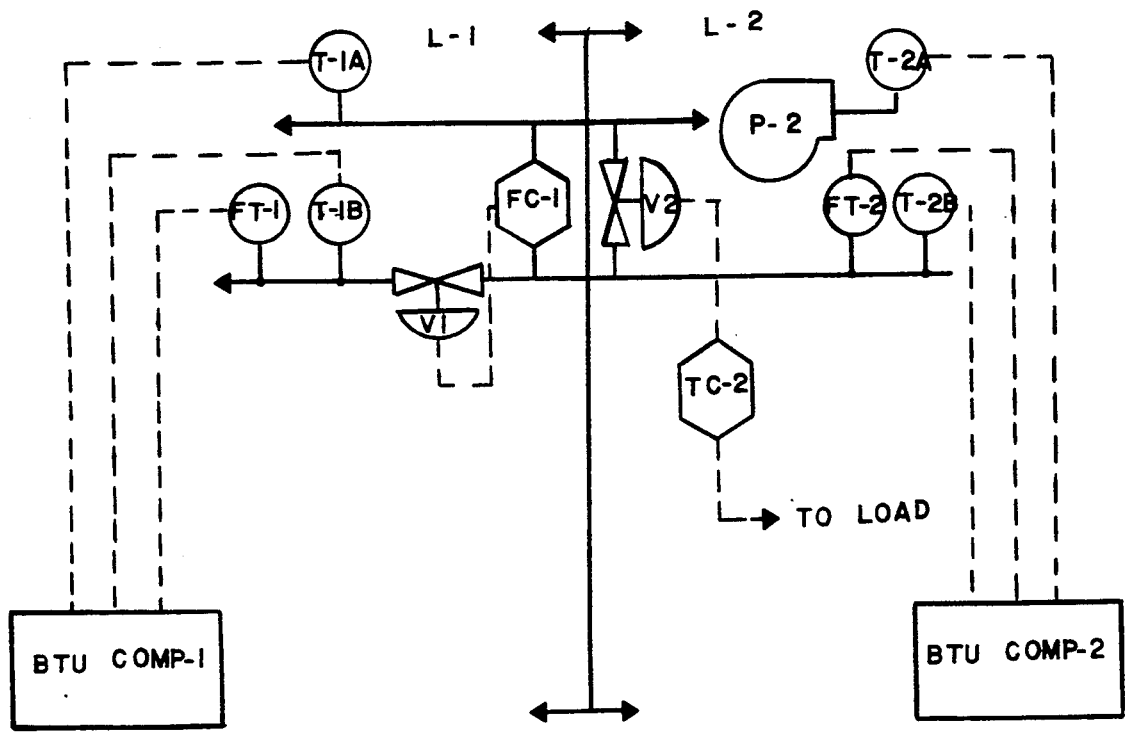
FIG. 5 depicts secondary and primary fluid flow systems similar to those shown in FIG. 3, with additional components having been added.

FIG. 5 depicts secondary and primary fluid flow systems similar to those shown in FIG. 3. Additional devices have been added.

FT-1 is a flow sensing element measuring the fluid flow through the primary system.

BTU COMP-1 is a computer that receives inuts from FT-1, T-1a and T-1b. The computer calculates the actual BTU load of the primary circulation system.

FT-2 is a flow sensing element measuring the fluid flow through the secondary system.

BTU COMP-2 is a computer that receives inputs from FT-2, T-1a and T-1b. The computer calculates the actual BTU load of the primary circulation system.

Figure 6:
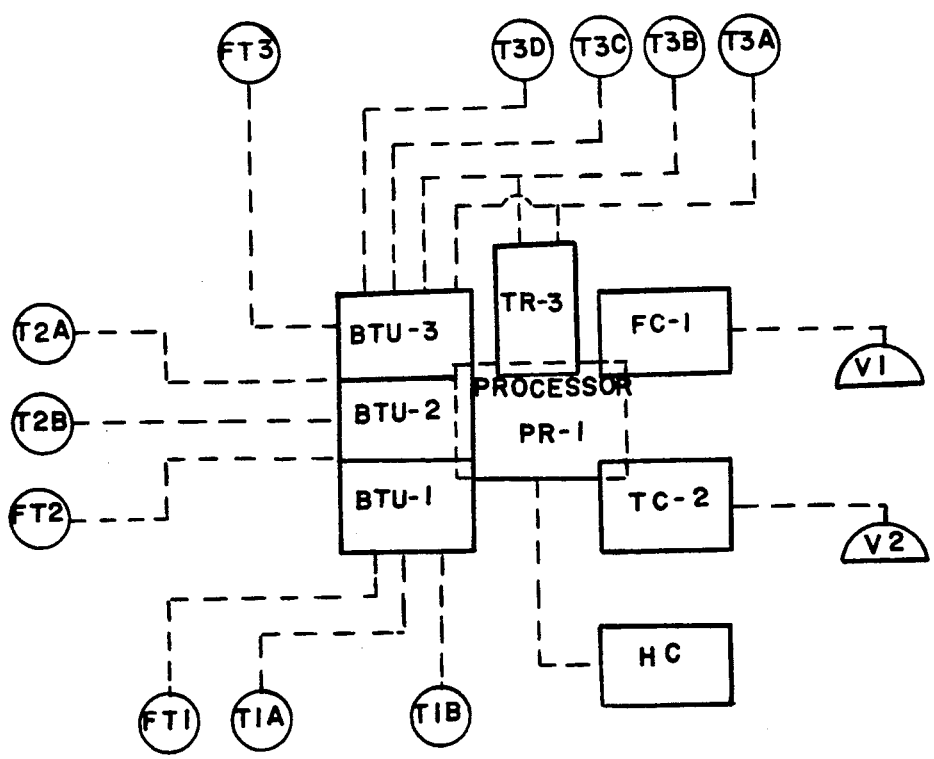
FIG. 6 is an illustration which incorporates the sensing, controlling and computing components from FIGS. 3, 4 and 5.

FIG. 6 incorporates the sensing, controlling, and computing devices from FIGS. 3, 4 and 5. It consolidates the activities of BTU COMP-1, BTU COMP-2, BTU COMP-3, TR-3, FC-1 and TC-2 into one integrated processor PR-1. Sensing points T-1a, T-1b, FT-1, T-2a, T-2b, FT-2, T-3a, T-3b, T-3b, T-3c, T-3d, and FT-3 are input into their particular control cell or cells.

HC is host computer that has access to multiple Integrated Processors, PR's.

The main objective of the controls and computed formulas is to satisfy the demand provided by the process load by the most efficient means. This means controlling to a given set point with the least amount of energy expended and with harmonious system component operation.

The control scheme is to measure the BTU load (BTU-3) and match it with the secondary loop (BTU-2) and the primary loop (BTU-1) while meeting the final resultant temperature as measured by load discharge sensor T-3a.

The load (L-3) (example shows a cooling coil) can be calculated by inputing the following information into the BTU computer (BTU-COMP-3); air flow (FT-30), discharge air dry bulb temperature (T-3a), discharge air wet bulb temperature (T-3c), entering air dry bulb temperature (T-3b), entering air wet bulb temperature (T-3d).

For remodule L-3, the BTU's transferred equals the air flow adjacent to the load in cubic feet per minute times the total heat or temperature change of the air being cooled times the constant 4.5, the standard ASHRE (American Society of Heating and Refrigeration Engineers) weight of air correction factor.

This is expressed as the equation:

$$BTU = (CFM) \times (TH) \times (4.5)$$

For heating air, the formula is the same except that the correction factor is 1.08. The equation is thus:

$$BTU = (CFM) \times (TH) \times (1.08)$$

The secondary circulation loop (L-2) feeds the load (L-3) with cooling fluid. Its BTU capacity can be measured by inputing the following information into the BTU comnputer (BTU COMP-2): entering fluid temperature (T-2a), leaving fluid temperature (T-2b), and secondary fluid flow (FT-2).

For module L-2, the BTU's transferred equals the process water flow through the module in gallons per minute times the total heat or temperature rise of the process water through the module times the constant 500, the standard ASHRE weight of water correction factor. This is expressed as the equation:

$$BTU = (GPM) \times (TH) \times (500)$$

The primary circulation loop (L-1) feeds the secondary loop (L-2) with cooling fluid. Its BTU capacity can be measured by inputing the following information into a BTU computer ("BTU=COMP-1): entering fluid temperature (T-1a), leaving fluid temperature (T-1b), and primary fluid flow (FT-1).

For module L-1, the BTU's transferred is the same as that for L-2, above, the process water flow through the module in gallons per minute times the total heat or temperature rise of the process water through the module times the constant 500, the standard ASHRE weight of water correction factor. This is expressed as the equation:

$$BTU = (GPM) \times (TH) \times (500)$$

BTU-1, BTU-2 and BTU-3 are integrated into a single processor (PR-1). A mathematical comparison is created between the BTU computations for the load L-3, secondary L-2 and primary L-1 circuits. This allows for statistical manipulation of this data to determine control decisions.

The load temperature controller (TC-2) is provided with a control set point that is intended to meet the needs of the area served by the load L-3 (cooling coil). This set point can be a variable whose actual value is determined by devices ranging from manual reset to a central host computer (HC).

The load temperature controller (TC-2) is integrated into the single processor (PR-1). TC-2 can now serve as a multiple function device. It receives its setup point. It feeds the set point information into the processor for control logic, control reset and required load BTU computation (BTU-3).

The required true load BTU computation (BTU-3) can be developed by knowing the fluid flow (F-3), entering dry bulb (T-3b), entering wet bulb (T-3d), and required leaving set point from TC-2.

The required BTU computation (BTU-3) can then set up a BTU target for the secondary loop (L-2). This in turn can determine a BTU target for the primary loop (L-1). All this information is fed into the processor (PR-1) to produce a control scheme to determine demand, reaction, windowing, history, profiling, limits and set points.

The following sensors are used to reset the processors for final set points. T-3a discharge dry bulb (and T-3c discharge wet bulb if required) and FC-1 crossover flow sensor.

T-3a discharge dry bulb continues to reset the control scheme established by the data processed with the BTU computations. This is facilitated by providing a control signal through TC-2 temperature control segment of processor PR-1 to the fluid control device V-2 located in the recirculation line of the secondary loop L-2.

FC-1 crossover flow sensor continues to reset the control scheme established by the data processor PR-1 to require that the primary flow loop L-1 provide the fluid needed by the secondary flow loop L-2 to meet the predetermined BTU demand. This is facilitated by providing a control signal through FC-1 flow control segment of processor PR-1 to the fluid control device V-1 located in the primary fluid circulation loop L-1.

The control system for the process is a microprocessor based device PR-1. The microprocessor operates from instructions stored in its memory. This memory is dynamic to allow saving of information as the process is controlled. This informaiton is a map of the relationship between the output and the input at any given time. This information and a control equation calculation are used by the controller PR-1 to make adjustment to the process through the output devices V-1 and V-2. The control equation evaluates mathematically corrected input signals and compares them to the desired values referred to here as the setpoints. The difference between the setpoint and the input signals is the computed offset. The computed offset reflects an amount of change required in the output to cause the process control devices to change the conditions of the process until its condition approaches the setpoint conditions. The adjustments that are calculated for output to the control devices are compared to the process information map created in memory by the microprocessor. The output to the control devices are modified based on the comparison of these values. As a part of this process, a data map is created for PR-1. The data map is composed of the items as shown in FIG.-6.

When a stable condition is reached the microprocesor PR-1 records the input and output values in the dynamic memory for comparison to future calculations. The control of the process relies on the fact that the input devices such as FC-1 and TC-2 are providing signals that represent the true condition of the measured process. In the previous design, this required a reduction in the response time of the input device to reduce the effect of a fluctating input signal. The new method for providing an accurate input signal uses statistical sampling at a faster rate of speed and linerization of the input measurement devices. The result of this type of input manipulation is a system that responds quickly to the process conditions without reacting to short duration fluctuations. The burden of controlling the system fluctuations becomes a function of the microprocessor PR-1 and not the input and output devices. This method of calculating the control requirements applies to more than the control of the load process temperature T-3a and the primary process flow system FC-1. Prior to this invention, T-3a and FC-1 were the sole devices to define the control strategy.

The control fuctions identified above T-3a (TC-2) and FC-1 operate as independent control elements in the process system but their control actions directly influence the other's equilibrium point of operation when implemented together. Prior compensation for this effect was accomplished by reducing the responsiveness of the individual control elements. The selection of the control devices, i.e., valves and flow metering equipment also caused the system performance to fluctuate. Because the flow monitoring FC-1 is accomplished by measuring a resultant pilot flow across the water bridge, the disruption caused by system fluctuation is reduced to the point that controlled manipulation of the secondary process loop could be maintained within reasonable operational limits. The introduction of both control functions on the same process system requires modification of the control equation as implemented in the individual process controllers. A master control equation must mediate between the two seperate control requirements to prevent erroneous control outputs based on the two controllers interactions and not changes in the actual process. The combination of both control systems into a single secondary process system requires compensation between the effects of the individual controllers. To accomplish this, both control programs reside in a single processor PR-1 with an additional mediation equation modifying the individual control equations. The function of this equation is to determine the difference between the process changing and the results of the other control equations effects on the systems through its output device. The error signal of both equations are examined and the greatest error signal is given control of its output device while the other systems control equation output is limited in its effect on the system. As the microprocessor PR-1 alternates between the control equations, the net result is that both systems approach the desired setpoint for their control equation. The method for calculating the desired response from the microporcessor based control system is based on a mathematical model of the physical equipment. This model is an energy balance equation designed to represent the flow of energy between the load or end user and the primary and secondary delivery systems. The parameters of control are converted into units common to all systems, i.e. BTU (BRITISH THERMAL UNITS). BTU-3=BTU-2=BTU-1.

The load can be calculated as a BTU per hour drain on the secondary process system. This means if the secondary process L-2 does not provide enough BTU/HR to the load L-3, the secondary process control system must alter its parameters of operation to exactly accomplish this goal. The indicator of the success of the altered operation is the difference between the desired energy (BTU-COMP-3) and the energy delivered to the load (BTU-COMP-2). This relationship is created dynamically in the microprocessor PR-1 as the system is controlled. The difference in setpoint temperature TC-2 and actual load discharge temperature T-3a is used as a target approximating the measured reponse saved in the microprocessor memory PR-1. The measured difference in BTU required and BTU delivered creates a response in the secondary process controls. To determine which of the controlled parameters, recirculation ratio TC-2 or primary fluid influx FC-1 should change, the amount of correction required by each to provide system balance is analyzed. A dynamic formula is stored in the processor PR-1 to mediate this relationship.

The system of mediation between the flow control FC-1/V-1 and recirculation control TC-2/V-2 is based on the process equation for the secondary process system and a program that determines if the recirculation valve V-2 is capable of providing the required process action to satisfy the load. The flow control valve V-1 not only guarantees the minimum flow rate for the secondary process system but also regulates the BTU transfer available to satisfy the load. THe recirculation valve V-2 adjusts the available BTU for the secondary process system load based on the calculation from the control algorithm.

Minimum and maximum limits are set for the control elements V-1 and V-2 as determined by their operating characteristics and system dynamics. When minimum and maximum limits are set on the flow rates, the relationship of master and slave can be mediated for control of the overall process. The primary driving parameter of the system is the load BTU-3. This defines the fine tuning of the control equation to stabilize the load requirements. Under stable conditions the recirculation flow V-2 modulates to deliver the required BTU to the load L-3. When the load L-3 requires more BTU from the system, the recirculation valve V-2 closes. As recirculation valve V-2 modulates within its predetermined limits, the primary valve V-1 has a corresponding requirement to modulate to meet the needs of V-2. The control limit of FC-1 holds the control of the recirculation valve V-2 and adjusts the primary flow control V-1 to provide more BTU to the secondary loop. By using the mediation equation the amount of change in L-1 is calculated for proper control to be regained. After the primary flow L-1 correction has been made, the recirculation valve V-2 is allowed to control the BTU delivered to the load. This process works the same for increase or decreases in load requirements. At the point when the load exceeds the controllable parameters of the system, the system will continue to operate at the configured limits minimum and maximum until the conditions change to allow control. The minimums and maximums are configured to maintain stable conditions for the secondary system.

In addition, limits can be provided to force a reaction of a primary control device even when its particular controller does not detect a need for change, i.e.: when V-2 is 100% open this indicates no demand for BTU transfer from Loop L-1 to Loop L-2. When this occurs a signal will be sent to PR-1 to close V-1 regardless of the control output from FC-1. Inversely: when V-2 is 100% closed PR-1 will receive a signal from V-2 and drive V-1 open until L-2 flow is satisfied regardless of control output from FC-1.

As in any control system, a method of control is only as good as the information the control decisions are based on. The microprocesser control for the water bridge uses statistical manipulation of the measured variables to filter out erroneous information. The microprocessor takes measurements and calculates a normal distribution of the process. The third standard deviation of this sample determines the minimum and maximum ranges of the data. The time of occurence of these minimums and maximums are centered around the period of oscillation of the measured variable. The x bar value of this sample represents the true process condition in the oscillating measured signal. As is conventional in the electronic arts, the x bar value is an electrically filtered value that has been statistically corrected to represent the actual system condition for instance, devices for sensing and measuring will read many values for a particular variable, but the x bar value, the result of electronic filtering of the sensed and measured readings, will be used in the control loop logic and calculations. This X bar value is used to control the process and reduces the overall oscillation of the system. By adjusting the sample size and sample period any harmonics of the oscillation can also be compensated for. This method will correct for physical oscillation characteristics of the controlled equipment or unstable measurement devices.

With the calculation and communication power of the microprocessor design of this system, distributed control points are the goal to overall stability of the system. Corrective action in any of the localized control points is communicated to the other control points. The information can predict changes in the primary system and result in compensation before the disturbance alters the local control process.

Once a particular load has been defined and mapped in the processor PR-1 the number of sensing points needed to provide reliable control can be minimized. The load and its set point as established by TC-2 can be managed by knowing the fluid flow FT-3 through the load, the leaving dry bulb T-$3a$, the entering dry bulb T-$3b$ and entering wet bulb T-$3d$. This data establishes BTU content of the load BTU COMP-3. (Note: If the fluid flow through the load does not vary a great deal, this flow can be programmed into BTU COMP-3 as a fixed value.) BTU COMP-3 can then be compared to BTU COMP-2. Data required to establish the BTU content of the secondary circuit L-2 as defined by BTU COMP-2 can consist of supply fluid temperature T-$2a$ and return fluid temperature T-$2b$. Once established, the fluid flow through circuit L-2 can be programmed into BTU COMP-2 as a fixed value. BTU COMP-2 can now be compared to BTU COMP-1. Data required to establish the BTU content of the primary circuit L-1 as defined by BTU COMP-1 can consist of supply fluid temperature T-$1a$, return fluid temperature T-$1b$ and primary fluid flow FT-1. (Note: T-$2b$ can be used as the return temperature for the BTU COMP-1 because T-$2b$ and T-$1b$ should be the same temperature.) In this example, load discharge fluid temperature T-$3a$, and water bridge flow sensor FC-1 are monitored as the two mediating points for final control. Thus the monitoring of seven points may be all that is necessary to define the BTU content of all three loops (BTU COMP-1, 2 and 3) are provided final control for the prime mediators, TC-2 and FC-1.

Communication to a central information and control system HC allows adjustment of the setpoint and other dynamic information without physical presence at each control location. An example of such an adjustment would be to limit the maximum BTU draw off of the primary flow loop L-1 by any given load.

The application to cooling, heating or other process is not a limiting factor in the application of this control system. The control microprocessor is used to allow entry of application specific modifications to the control equations and operational limits.

Monitoring and Control Panels

Shown in FIGS. 1 and 1A are five control panels working in systems configuration for monitoring and controlling the entire flow control system. They include the airflow control panel coupled with respect to the air cooling subsystem, the decoupler panel coupled with respect to the decoupler assembly between the water chiller subassembly and the air cooling subassembly, the chiller analyzer panel coupled with respect to the water chiller subassembly, the main system analyzer coupled with respect to the other control panels, and the host computer for coupling all of the water bridge controllers.

The air flow control panel includes dials for indicating the air supply AS in cubic feet per minute, the exhaust/recirculating airflow ER in cubic feet per minutes, and the static pressure SP to the air system for the air supply. These last two dials include manual adjustment mechanisms under the control of an operator. The other six indicator blocks are for measuring and indicating the power usage in kilowatts of the airflow AF, the entering water temperature EWT, the leaving water temperature LWT, the leaving air temperature LAT (which may be reset manually), the entering air temperature EAT and the gallon per minute water usage GPM to the secondary loop.

Lastly, an adjustable two-way sensor LAC for the water bridge control valve it utilized. In addition to the inputs through the air flow control panel from the secondary loop components, the adjustment mechanisms of the air flow control panel feedback input to the secondary loop elements. Further, the readings of various components of the air flow control panel are fed to the main system analyzer for monitoring the power usage and other variables of the system from all of the secondary loops.

The decoupler panel includes readouts for the refrigeration loop water usage RLS in gallons per minute and primary chilled water transfer loop PCW line water usage in gallons per minute (GPM). Also, there is the primary chilled water supply temperature PCWS. These items are adjustable to feed back to the decoupler panel and may operate in an automatic or manual mode. Other readouts are the entering and leaving water temperature RLRT and PRT and gallons per minute (GPM), as well as the entering and leaving water pressures RLST and PST. The output of the decoupler panel is fed back to the decoupler through the adjustment mechanisms as described above. The usage in terms of power and temperature is also fed to the main system analyzer along with the read temperature and pressure.

The decoupler panel also functions to monitor and control the water chiller subassembly which has three adjustment features with associated readouts. These are for the water flow therethrough GPM in gallons per minute, the temperature of the leaving water LWT, and the condenser pressure COND for the water controller valve. Further readouts are for the entering water temperature ECWT, leaving water temperature LCWT and power usage. On/off switchs are provided along with a light to indicate a malfunction and the need for operator assistance. In addition to the adjustment features feeding back to the water chiller subassembly, the output of the water chiller analyzer panel is also fed to the main system analyzer for integrating these readings.

The main system analyzer receives its input from the decoupler panel, chiller analyzer panel and the air flow control panel. It has two adjustable readouts, for the water leaving temperature PCWLS and for the leaving air temperature LAT. The outputs from these variable control features are fed back to the water chiller subassembly for control purposes. The rest of the components of the main system analyzer are for receiving and assembling the outputs of the various other panels of the system. These additional readouts are for total air flow CFM in cubic feet per minute and associated power usage in kilowatts KW, total system TS kilowatts KW, cooling water and air temperature, and flow power usage in kilowatts. Associated with the main system analyzer is an off/on with start/stop features for the system and lights to indicate operation of the fan, chiller and pump along with an indication of temperature. A keyboard is provided to monitor and modify the readings through modifying the system which provides the readings.

The last component of the system is the host computer showing FIG. 1A operatively coupled with the water bridge of the secondary loop with lines for coupling with other similar water bridges of the other water loops.

Alternate Embodiment

Figure 7:
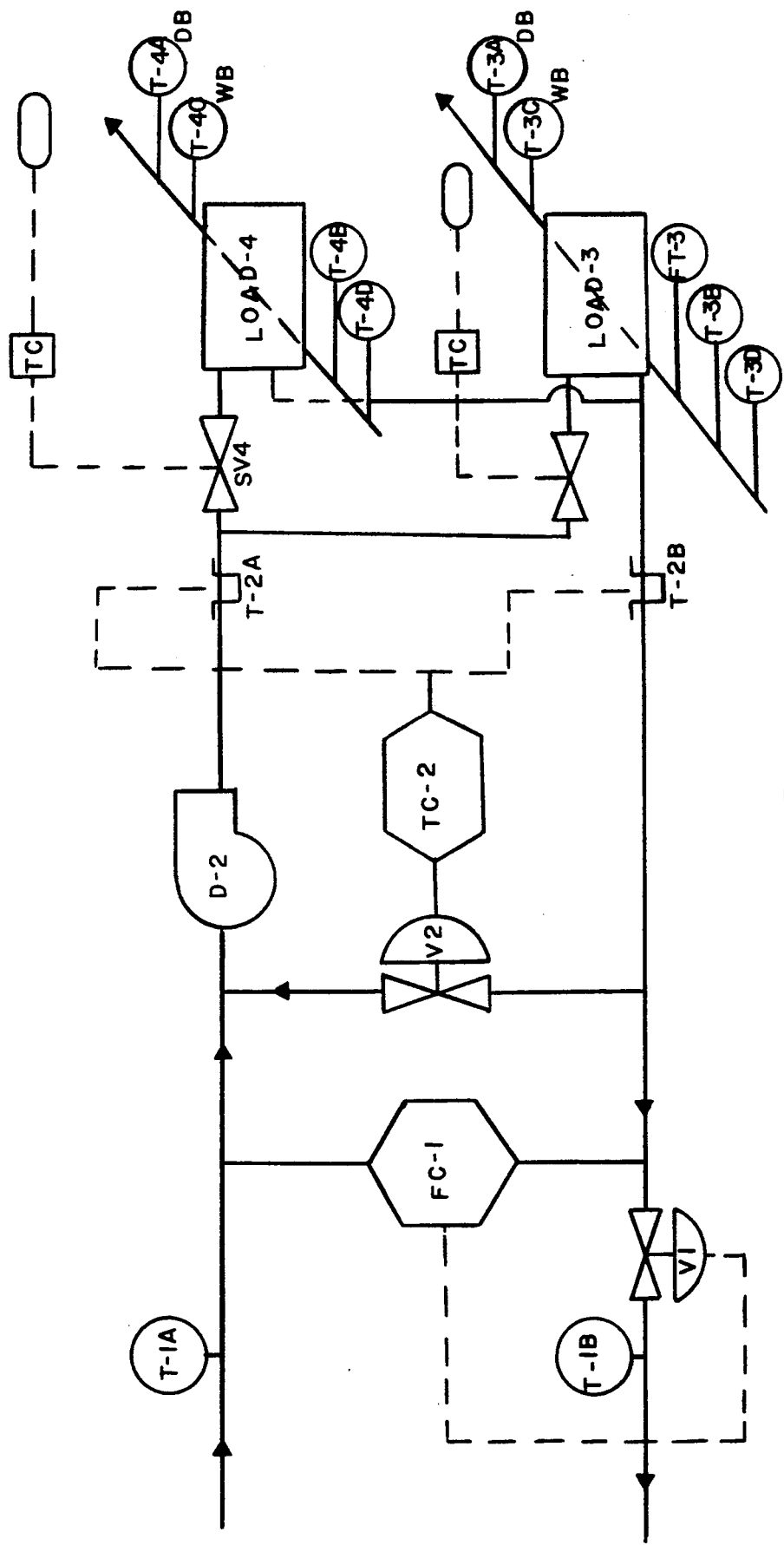
FIG. 7 is an illustration of an alternate embodiment of the invention.

Shown in FIG. 7 is a modification of the above described apparatus which constitutes an alternate embodiment of the invention. In the FIG. 7 embodiment, at least one of the secondary loops is modified to split the feed of its processing liquid into plural paths of travel. Each of the plurality of paths of travel of the processing liquid thus constitutes a load, and the plurality of loads are located at a plurality of regions over which individual loops of air are moved for cooling such moved air. Any number of loads may be utilized on any of the secondary loops. Two such loads, LOAD 1 and LOAD 2, are shown in FIG. 7.

As in the primary embodiment, T-1A and T-1B are sensors in the primary flow loop for determining the temperatures of the processing liquid into and out of the secondary loop. FC-1 is the control device used to control the fluid interface between the primary and secondary flow loops. Valve V-1 is the fluid flow controlling valve in the primary loop, receiving its control signal from FC-1.

In the secondary loop is valve V-2, a fluid flow controlling device in the cross over line for controlling the flow of processing fluid in the secondary loop. Valve V-2 receives its control signal from the control device TC-2. Control device TC-2 controls the flow of processing liquid through the secondary loop. TC-2 is controlled by the output of the water temperature as sensed from T-2B minus T-2A or the temperature differential and from the final load inputs from LOAD 3 and LOAD 4 as described in the FIG. 7 embodiment.

As can be seen in FIG. 7, the lines of the secondary loop remote from the primary loop are split to have input and output lines to the various loads. These loads are shown as LOAD 3 and LOAD 4 in FIG. 7. Each load has separate sensors at their individual load inputs and outputs. By way of example, LOAD 3 has a wet bulb sensor T-3D and a dry bulb sensor T-3B and a flow sensor FT-3 at the input end of LOAD 3 and a wet bulb sensor T3-C and a dry bulb sensor T3-A at the output of LOAD 3. Similarly, LOAD 4 has a wet bulb sensor T-4D and a dry bulb sensor T-4B and a flow sensor FT-4 at the input end of LOAD 4 and a wet bulb sensor T4-C and a dry bulb sensor T4-A at the output of LOAD 4. The inputs and outputs to the plurality of loads are all fed into the local processor for the particular secondary loop along with the output signals from the fluid temperature sensors T2-A and T2-B which determine the temperature to and from the plurality of loads. These various inputs and outputs are averaged and integrated for generating signals for controlling the particular secondary loop through valve V-2. Supplemental valves, SV-3 and SV-4, are load control valves controlled by the leaving air condition of the load as sensed by T-3C and T-3CA and T-3C and T-B. They are provided to the input lines of the individual loads of the particular secondary loop, are also controlled by the local processor for the particular secondary load. And, as in the primary embodiment, the local processor also inputs the host computer for balancing the overall system.

Method of Operation

As can be understood from the forgoing, the component elements of the above described system of the present invention involve a method for controlling process liquid used for cooling air which is moved in heat exchanging relationship with the process liquid.

The method comprises the steps of first providing a plurality of air flow loops for the movement of air to be cooled. A movement of air is then effected along each associated air flow loop by means of fans. Thereafter, a plurality of secondary loops are provided for the movement therethrough of process liquid, preferably water. Each secondary loop has a load positioned in its associated air flow loop for the passage thereadjacent of air in its associated air flow loop to be cooled. The movement of process liquid is then effected along its associated secondary loop by a pump.

Secondary signals are then generated with secondary loop load sensors. Such secondary signals represent the air flow and change of psychrometric properties, temperature and relative humidity, of the air across the load and the BTU transfer across the load. Such BTU transfer is determined by the product of the air flow and the change of psychrometric properties of the air across the load and the constant 4.5.

A primary loop is then provided for the circulation of process liquid through the secondary loop. The movement of process liquid alongs its associated primary loop is effected by a pump. The primary loop includes a chiller operatively associated therewith to chill the process liquid circulating through the primary loop.

Primary signals are then generated with chiller sensors. Such primary signals represent the process liquid flow and the change of temperature of process liquid through the chiller and the BTU transfer at the chiller. Such BTU transfer is determined by the product of the process liquid flow, temperature change of the process liquid through chiller and the constant 500.

Thereafter, a plurality of bridges are provided. An associated bridge couples each secondary loop is couples with the primary loop. Each bridge has valve means for controlling the flow of process liquid through its associated secondary loop.

Tertiary signals are then generated at each bridge by bridge sensors. Such sensors represent the process liquid flow and temperature change of the process liquid through the bridge and the BTU transfer at the bridge. Such BTU transfer is determined by the product of the process liquid flow, temperature change of the process liquid and the constant 500.

A local processor is provided at each of the plurality of bridges. Each local processor receives the primary, secondary and tertiary signals from the chiller sensor means and its associated load sensors and bridge sensors. Each local processor then computes a mathematical relationship between the BTU transfer of the air across its associated load, and the BTU transfer of the process liquid through its associated bridge, and the BTU transfer of the process liquid through the chiller and, in response to such computed mathematical relationship, establishes a primary set point.

The next steps include providing a driver controller at each local processor and controlling the process liquid flow of the primary loop and the secondary loop and the air flow across the load from the driver controller.

The plurality of local processors are coupled with a host computer. The BTU transfer of the chiller and the BTU transfers of the plurality of bridges are varied in response to the BTU transfers of the air flows across the plurality of loads. The BTU transfers at the plurality of loads equals the sum of the BTU transfers of the plurality of bridges and the BTU transfer at the chiller.

The method further includes the step of calculating the process reactions to the various BTU transfers. In response thereto, a mapped response file and historical file of operations are built for creating a model of each bridge. Such model includes anticipatory reactions of the system. The method further includes the step of providing limits and set points from the host computer for the plurality of local processors based upon historical records and particular system operational requirements.

The present disclosure includes that contained in the appended claims as well as that of the foregoing description. Although this invention has been described in its preferred form with a certain degree of particularity, it is understood that the present disclosure of the preferred form has been made only by way of example, and that numerous changes in the details of construction and combination and arrangement of parts may be resorted to without departing from the spirit and scope of the invention.

Now that the invention has been described,

What is claimed is:

1. A system for controlling the flow of process fluids comprising:
    a primary loop for process fluids;
    a plurality of secondary loops for the process fluids;
    a plurality of bridges, each coupling the primary loop with a secondary loop, each bridge having feed and return connections coupled to feed and return lines of the primary loop with feed and return connections coupled to feed and return lines of the secondary loop, and a crossover line coupling the primary and secondary loops;
    valve means for each bridge for controlling the flow of processing fluid through its associated secondary loop;
    microprocessor means for each bridge for adjusting its associated valve means;
    sensor means for each bridge for determining operating characteristic information of the processing fluid and for feeding such determined information to the microprocessor means; and
    a host computer coupling each of the microprocessor means in systems configuration.

2. The system as set forth in claim 1 wherein the microprocessor means are each provided with operational set points and the host computer is adapted to adjust such set points individually.

3. The system as set forth in claim 2 wherein the host computer includes a sensor for each secondary loop and is adapted to adjust each set points individually in response to the information sensed.

4. Apparatus for coupling a primary and secondary loop for circulating processing fluids therebetween comprising:
- a first connection for the feed line of the primary loop, a second connection for the return line of the primary loop, a third connection for the feed line of the secondary loop and a fourth connection for the return line of the secondary loop;
- a crossover line coupling the four connections;
- first valve means with a first sensor means responsive to the flow across the crossover line to control the first valve means;
- second valve means with a second sensor means responsive to the temperature of the process fluid in the secondary loop to control the second valve means;
- a common microprocessor for the first and second sensor means to control the first and second valve means as a function of the sensed flow and temperature; and
- a computer associated with each secondary loop operable in response to the temperature associated with load fluid adjacent to its associated secondary loop to control the common microprocessor for each secondary loop.

5. The apparatus as set forth in claim 4 wherein each microprocessor has setting information for each valve.

6. The apparatus as set forth in claim 5 wherein the computer includes a sensor for each secondary loop and means to vary the setting information in response thereto.

7. The apparatus as set forth in claim 6 wherein each microprocessor includes logic and controls to vary its setting information as well as cross over logic and controls therebetween.

8. The apparatus as set forth in claim 6 wherein the sensor includes temperature responsive means before and after the secondary loop to determine the temperature differential of air before and after movement through the secondary loop.

9. Apparatus for cooling a flow of air at a plurality of sites comprising;
- a process water chiller subassembly and a plurality of air cooling subassemblies;
- means for feeding a flow of process water in a primary loop extending between the process water subassembly and the plurality of air cooling subassemblies;
- means for effecting a flow of air to be cooled across the secondary loops at the sites to be cooled;
- a plurality of water bridges, each coupling the primary loop with a secondary loop with a crossover line coupling the primary and secondary loops;
- means for sensing the flow in each waterbridge crossover line and the temperature of the process water in each secondary loop;
- a common microprocessor for each water bridge, each common microprocessor having setting information for its control;
- means for adjusting the valves of each secondary loop through its associated common microprocessor as a function of the sensed temperature and pressure;
- means for sensing the temperature differential of the air being passing adjacent to each secondary loop and controlling its associated common microprocessor; and
- means for coupling the common microprocessors with a host computer for individually controlling the setting information of each common microprocessors in systems configuration.

10. Apparatus for the cooling of air by its passage adjacent to a load containing circulating cooling fluid, the apparatus comprising:
- a load module having a load for the passage of circulating cooling fluid therethrough and for the passage of air thereadjacent for being cooled by the circulating cooling fluid, the load module also having sensors for the air being cooled;
- a secondary module having input lines and output lines for the passage of the circulating cooling fluid therebetween and to the load module, the secondary module also having sensors for the circulating cooling fluid and a device for controlling the circulating cooling fluid and means for controlling the device;
- a primary module having input lines and output lines for the passage of the circulating cooling fluid therebetween and to the secondary module, the secondary module also having sensors for the circulating cooling fluid and a device for controlling the circulating cooling fluid and means for controlling the device; and
- control means to receive and mediate sensed information from the sensors at the primary and secondary modules, to compare such sensed information with sensed information at the load module and to adjust the devices in response to the demand generated by the sensed information at the load.

11. The apparatus as set forth in claim 10 wherein the control means are adapted to filter out extraneous information and utilize the X-bar value of such sensed information.

12. Apparatus for the cooling of air by its passage adjacent to a load containing circulating cooling fluid, the apparatus comprising:
- a load module having a load for the passage of circulating cooling fluid therethrough and for the passage of air thereadjacent for being cooled by the circulating cooling fluid, the load module also having sensors for the air being cooled;
- input module means having input lines and output lines for the passage of the circulating cooling fluid therebetween and to the load module, the input module means also having sensors for the circulating cooling fluid and flow control means for controlling the circulating cooling fluid and control means for fhe flow control means; and
- processor means to receive the sensed information from the sensors at the input module means and to compare such sensed information with sensed information at the load module and to adjust the flow control means in response thereto, the processor means being adapted to filter out extraneous information and utilize the X-bar value of the sensed information for comparison purposes.

13. The apparatus as set forth in claim 12 wherein the processor means is adapted to mediate between a plurality of inputs from the sensed information.

14. A system for the cooling of flows air by its passage adjacent to loads, each load containing circulating cooling fluid, the apparatus comprising:
- a plurality of load modules, each having a load for the passage of circulating cooling fluid therethrough and for the passage of air thereadjacent for being cooled by the circulating cooling fluid, each load module also having sensors for the air being cooled;

a plurality of secondary modules, each having input lines and output lines for the passage of the circulating cooling fluid therebetween and to an associated load module, each secondary module also having a valve for controlling the circulating cooling fluid and sensors for circulating cooling fluid and control means for the valve, the sensors adapted to determine the input fluid flow and temperatures and valve position;

a plurality or primary modules, each having input lines and output lines for the passage of the circulating cooling fluid therebetween and to an associated secondary module, each primary module also having a valve for controlling the circulating cooling fluid and sensors for the circulating cooling fluid and control means for the valve, the sensors adapted to determine the input and output fluid flow and temperatures and valve position; and control means including a controller for each load module adapted to receive the input and output signals and a host computer for a plurality of controllers adapted to receive inputs from the plurality of controllers.

15. Apparatus for the cooling of air by its passage adjacent to a load containing circulating cooling fluid, the apparatus comprising:

a load module having a load for the passage of circulating cooling fluid therethrough and for the passage of air thereadjacent for being cooled by the circulating cooling fluid, the load module also having sensors for the air being cooled;

input module means having input lines and output lines for the passage of the circulating cooling fluid therebetween and to the load module, the input module means also having sensors for the circulating cooling fluid and flow control means for controlling the circulating cooling fluid and control means for the flow control means; and processor means responsive to the sensed information from the load module for generating a demand and to adjust the flow control means in response there for satisfying the demand.

16. The apparatus as set forth in claim 15 wherein the processor means also receives sensed information from the sensing means of the input module and uses the sensed information for both information and reset purposes.

17. The apparatus as set forth in claim 16 wherein the processor means includes a controller for each of a plurality of modules and a host computer for coupling the controllers.

18. A method of cooling a flow of air at a plurality of sites comprising the steps of:

providing a process water chiller subassembly and a plurality of air cooling subassemblies;

feeding a flow of process water in a primary loop extending between the process water subassembly and the plurality of air cooling subassemblies;

effecting a flow of air to be cooled across the secondary loops at the sites to be cooled;

providing a plurality of water bridges, each coupling the primary loop with a secondary loop with a crossover line coupling the primary and secondary loops;

sensing the flow in each waterbridge crossover line and the temperature of the process water in each secondary loop;

providing a common microprocessor for each water bridge;

adjusting the valves of each secondary loop through its associated common microprocessor as a function of the sensed temperature and pressure;

sensing the temperature differential of the air being passing adjacent to each secondary loop and controlling its associated common microprocessor; and coupling the common microprocessors with a host computer for controlling the common microprocessors in systems configuration.

19. A method of coupling a primary and secondary loop for circulating processing fluids therebetween comprising the steps of:

providing a first connection for the feed line of the primary loop, a second connection for the return line of the primary loop, a third connection for the feed line of the secondary loop and a fourth connection for the return line of the secondary loop;

providing a crossover line coupling the four connections;

providing a first valve means with a first sensor means responsive to the flow across the crossover line to control the first valve means;

providing a second valve means with a second sensor means responsive to the temperature of the process fluid in the secondary loop to control the second valve means;

providing a common microprocessor for the first and second sensor means to control the first and second valve means as a function of the sensed flow and temperature; and controlling the common microprocessor for each secondary loop with a computer associated with each secondary loop operable in response to the temperature associated with load fluid adjacent to its associated secondary loop.

20. A system for controlling process liquid used for cooling air passing in heat exchanging relationship therewith comprising:

a plurality of air flow loops for the movement of air to be cooled, each air flow loop including a fan to effect the movement of air along its associated air flow loop;

a plurality of secondary loops for the movement of process liquid therethrough, each secondary loop having a load positioned for the passage thereadjacent of air to be cooled, each secondary loop having load sensor means to generate secondary signals representing the air flow and change of psychrometric properties of the air across the load and the BTU transfer at the load, such BTU transfer being determined by the product of the air flow and the change of psychrometric properties of the air across the load and the constant 4.5;

a primary loop for the circulation of process liquid therethrough, the primary loop including a chiller operatively associated therewith to chill the process liquid circulating therethrough, the chiller having chiller sensor means to generate primary signals representing the process liquid flow and the change of temperature of the process liquid through the chiller and the BTU transfer at the chiller, such BUT transfer being determined by the product of the process liquid flow, temperature change of the process liquid through the chiller and the constant 500;

a plurality of bridges, each bridge coupling the primary loop with an associated secondary loop, each bridge having valve means for controlling the flow of process liquid through its associated secondary loop, each bridge also having bridge sensor means to generate tertiary signals representing the process liquid flow and temperature change of the process liquid through the bridge and the BTU transfer at the bridge, such BTU transfer being determined by the product of the process liquid flow, temperature change of the process liquid and the constant 500;

a local processor located at each of the plurality of bridges, each of the local processors adapted to receive the primary, secondary and tertiary signals and, in response thereto, to form a mathematical relationship between the BTU transfer of the air across its associated load, and the BTU transfer of the process liquid through its associated bridge, and the BTU transfer of the process liquid through the chiller and to establish a primary set point, each local processor also including a driver controller for the flow control of the primary loop, the secondary loop and the air flow across the load; and a host computer coupling the plurality of local processors for varying the BTU transfer of the chiller and the plurality of bridges in response to the BTU transfer of the air flow across the plurality of loads such that BTU transfer at the plurality of loads equals the sum of the BTU transfers at the plurality of bridges and at the chiller.

21. The system as set forth in claim 20 wherein each local processor is adapted to accept input signals from its associated bridge and air flow as well as the chiller and, in response thereto, to calculate the process reactions and build a mapped response file and a historical file of operations for creating a model of each bridge inclusive of anticipatory reactions.

22. The system as set forth in claim 21 wherein the host computer is adapted to provide limits and set points for the plurality of local processors based on historical records and particular system operational requirements.

23. A system for controlling water used for cooling air passing in heat exchanging relationship therewith comprising:

a plurality of air flow loops for the movement of air to be cooled;

a plurality of secondary loops for the movement of water therethrough, each secondary loop having at least one load means positioned for the passage thereadjacent of air to be cooled, each secondary loop having load sensor means to generate secondary signals representing the air flow and change of properties of the air across the load and the BTU transfer at the load means;

a plurality of bridges, each bridge coupled to an associated secondary loop, each bridge having means for controlling the flow of water through its associated secondary loop, each bridge also having bridge sensor means to generate tertiary signals representing the water flow and temperature change of the water through the bridge and the BTU transfer at the bridge;

a primary loop coupled to the plurality of bridges and secondary loops for the circulation of water therethrough, the primary loop including a chiller operatively associated therewith to chill the water circulating therethrough, the chiller having chiller sensor means to generate primary signals representing the water flow and the change of temperature of the water through the chiller and the BTU transfer at the chiller;

a local processor located at each of the plurality of bridges, each of the local processors adapted to receive the primary, secondary and tertiary signals and, in response thereto, to form a mathematical relationship between the BTU transfer of the air across its associated load, and the BTU transfer of the water through its associated bridge, and the BTU transfer of the water through the chiller, each local processor also including a driver controller for the flow control of the primary loop, the secondary loop and the air flow across the load; and a host computer coupling the plurality of local processors for varying the BTU transfer of the chiller and the plurality of bridges in response to the BTU transfer of the air flow across the plurality of loads.

24. The system as set forth in claim 23 wherein at least one of the secondary loops has coupled thereto a plurality of load means for the movement of air thereacross.

25. A method for controlling process liquid used for cooling air passing in heat exchanging relationship therewith, the method comprising the steps of:

providing a plurality of air flow loops for the movement of air to be cooled;

effecting the movement of air along its associated air flow loop;

providing a plurality of secondary loops for the movement of process liquid therethrough, each secondary loop having a load positioned in its associated air flow loop for the passage thereadjacent of air to be cooled;

effecting the movement of process liquid along its associated secondary loop;

generating secondary signals with secondary loop load sensor means to represent the air flow and change of psychrometric properties of the air across the load and the BTU transfer thereat, such BTU transfer being determined by the product of the air flow and the change of psychrometric properties of the air across the load and the constant 4.5;

providing a primary loop for the circulation of process liquid therethrough;

effecting the movement of process liquid along its associated primary loop, the primary loop including a chiller operatively associated therewith to chill the process liquid circulating therethrough;

generating primary signals with chiller sensor means to represent the process liquid flow and the change of temperature of process liquid through the chiller and the BTU transfer at the chiller, the BTU transfer being determined by the product of the process liquid flow, temperature change of the process liquid through the chiller and the constant 500;

providing a plurality of bridges;

coupling each secondary loop with the primary loop and with an associated bridge, each bridge having valve means for controlling the flow of process liquid through its associated secondary loop;

generating tertiary signals at each bridge by bridge sensor means to represent the process liquid flow and temperature change of the process liquid through the bridge and the BTU transfer at the bridge, the BTU transfer being determined by the product of the process liquid flow, temperature change of the process liquid and the constant 500;

providing a local processor located at each of the plurality of bridges;

receiving at each of the local processors the primary, secondary and tertiary signals from the chiller sensor means and its associated bridge sensor means and load sensor means;

forming at each local processor a mathematical relationship between the BTU transfer of the air across its associated load, and the BTU transfer of the process liquid through its associated bridge, and the BTU transfer of process liquid through the chiller and establish a primary set point in response to such mathematical relationship;

providing a driver controller at each local processor;

controlling the process liquid flow of the primary loop and the secondary loop and the air flow across the load from the driver controller; and coupling the plurality of local processors with a host computer for varying the BTU transfer of the chiller and the BTU transfers of the plurality of bridges in response to the BTU transfers of the air flows across the plurality of loads such the BTU transfer at the plurality of loads equals the sum of the BTU transfers of the chiller and the plurality of bridges.

26. The method as set forth in claim 25 and further including the step of calculating the process reactions to the various BTU transfers and, in response thereto, building a mapped response file and historical file of operations for creating a model of each bridge inclusive of anticipatory reactions.

27. The method as set forth in claim 26 and further including the step of providing limits and set points from the host computer for the plurality of local processors based on historical records and particular system operational requirements.

* * * * *